United States Patent Office 2,986,543
Patented May 30, 1961

2,986,543

PROCESS FOR PREPARING STYRENATED NON-DRYING AND/OR SEMI-DRYING OIL MODIFIED ALKYD RESINS BY INCREMENTAL MONOMERIC ADDITION

John H. Daniel, Jr., Old Greenwich, Conn., assignor to American Cyanamid Company, New York, N.Y., a corporation of Maine No Drawing. Filed Oct. 20, 1958, Ser. No. 768,025

8 Claims. (Cl. 260—22)

This invention relates to a process for the preparation of the styrenated oil-modified alkyd resins, and, more particularly, to the process wherein the oil modifier is a non-drying or semi-drying oil, or the fatty acids derived therefrom.

Still further, this invention relates to a process for the preparation of styrenated oil-modified alkyd resins wherein the polymerization of the styrene is accomplished by adding said monomeric styrene to the heated oil or to the reaction product of the oil and the polyhydric alcohol such as the monoglyceride and fatty acid in small increments followed by the subsequent addition of polyhydric alcohol and polycarboxylic acid, in alkyd forming proportions, and heating the mixture until the styrenated alkyd is formed.

One of the objects of the present invention is to produce a styrenated oil-modified alkyd resin containing a non-drying or semi-drying oil or the fatty acids derived therefrom which is compatible in all of its components, as indicated by its disinclination to break down into separate phases. The resins of the present invention also give clear homogeneous films upon evaporation of the solvent therefrom. A further object of the present invention is to produce a styrenated oil-modified alkyd by adding a styrene to a non-drying or semi-drying oil, which has been heated to a temperature of at least 140° C., in small increments and by continuing the heating of the oil-styrene mixture after the addition of the styrene has been completed until substantially complete polymerization of the styrene has been accomplished, thereafter adding a polyhydric alcohol and a saturated polycarboxylic acid in alkyd-forming proportions and continuing heating of the entire mixture until substantially complete esterification has been accomplished.

A still further object of the present invention is to produce surface coating materials in the nature of a styrenated oil-modified alkyd resin which is capable of producing films which are hard, clear, having high gloss and high gloss retention.

A further object of the present invention is to add a styrene in small increments to a heated oil such as a non-drying or semi-drying oil, and continuing said heating, after the addition of the styrene has been completed, until substantially complete polymerization has been accomplished; thereafter, adding a polyhydric alcohol to form the alcoholysis product of the polyhydric alcohol and the oil; thereafter, adding sufficient saturated polycarboxylic acid so as to permit substantially complete esterification and continuing heating until such esterification is accomplished.

A further object of the present invention is to produce styrenated alkyd resins in a process wherein no solvent is used. The reactive ingredients themselves being the only components in the reaction system.

A still further object of the present invention resides in the practice of the process of the present invention wherein a solvent is used and the subsequent azeotropic distillation of the water is accomplished while maintaining the solvent phase in the reaction system.

These and other objects of the present invention will be discussed more fully hereinbelow.

In the practice of the process of the present invention, it is necessary to add the styrene type of compound to the non-drying or the semi-drying oils, or their fatty acids, in small increments, in order to polymerize the styrene in the oil or fatty acids, to produce a product which is homogeneous, as contrasted with the heterogeneous type of product which is produced when styrene and oil are heated together without benefit of increment addition of the styrene. This is particularly true with respect to the non-drying and semi-drying oils and their fatty acids. This may not be the case when the drying oils or the fatty acids derived therefrom are used. When styrene is polymerized with drying oils, the two components may be introduced simultaneously in substantial quantities into the reaction sphere and heated to accomplish the polymerization of the mixture. The resultant polymerization product is homogeneous and may be subsequently treated with polyhydric alcohol and polycarboxylic acid in alkyd resin-forming proportions without any difficulty. This latter concept is illustrated in U.S. Patent No. 2,495,458 of Kanning et al. Kanning et al. believed that it was necessary to use drying oils and the fatty acids derived therefrom, particularly those having a critical Woburn iodine number and a critical Woburn diene number. I have discovered that I can prepare a styrenated oil-modified alkyd resin by using non-drying oils or semi-drying oils having no diene value by adding the styrene to the non-drying or semi-drying oils in small increments, polymerizing the mixture and thereafter adding a polyhydric alcohol and a polycarboxylic acid in alkyd forming proportions and esterifying the mixture. The following examples are set forth in order to illustrate further the concept of the present invention. It should be noted, however, that specific enumeration of detail is set forth in these examples solely for the purpose of illustration and should not be interpreted as limitations on the case, except as indicated by the appended claims. All parts are parts by weight.

Example 1

698 parts of Plastolein 9305 (a cottonseed oil acid fraction) are introduced into a suitable reaction chamber equipped with thermometer, stirrer and reflux condenser. The oil acids are heated to a temperature of about 170° C. and maintained at that temperature while a mixture of 530 grams of monomeric styrene and 14.5 parts of ditertiary butyl peroxide is added slowly in a dropwise fashion over about a two-hour period. After the addition of the styrene is completed, the heating is continued at about 170° C. for approximately 3½ hours or more, while the reaction mixture is stirred constantly. To the reaction mixture is added 296 parts of phthalic anhydride and 218 parts of glycerol (98%) and the reflux condenser is removed from the reaction system. The entire mixture is then heated at about 230° C. and maintained at this temperature for about a five-hour period, during which time a steady stream of nitrogen gas is passed through the flask to facilitate the removal of water and to provide a blanket of inert gas to the reacting alkyl. At the end of the five-hour period, the acid number of the resin is 9 and the viscosity, when diluted to 70% non-volatile solids with Varsol No. 2 (a mineral spirits solvent) is Z—. Films prepared from this resin solution dry rapidly to a hard finish with a very high gloss.

Example 2

245 parts of refined soya oil and 250 parts of dehydrated castor oil are introduced into a suitable reaction chamber equipped with thermometer, stirrer and reflux condenser, and a tube for the introduction of an inert gas. The oil mixture is heated gradually up to a temperature of about 170° C. and, while maintaining this temperature, a mixture of 21 parts of cumene hydroperoxide and 332 parts of styrene are added in small increments over a two-hour period. When the styrene-catalyst mixture has been completely added, the heating is continued for about five hours at 170° C. in order to complete the polymerization reaction. The styrenated oil thus produced is a clear, viscous liquid when cooled. The styrenated oil is maintained at 170° C. and 85 parts of pentaerythritol and 5 parts of cottonseed oil acids are added and the condenser is removed from the system. The heat is increased, under a flow of nitrogen gas, to 260° C. at which temperature the reaction mixture is held for 1¾ hours to effect the alcoholysis of the styrenated oil. Thereafter, the temperature is lowered to about 200° C., and 148 parts of phthalic acid anhydride are added and the heat is again increased to about 245° C., where it is allowed to remain for about 4 hours. At the end of the heating period, the resin has an acid number of about 5.6, and a viscosity of Z+ as a 60% solids solution in Varsol No. 2 on the Gardner-Holdt scale at 25° C. A yield of 96.3% of the starting materials is realized (after subtracting the theoretical water liberated). The clear resin solution produced shows a very high compatibility with mineral spirits (550 pounds of Varsol No. 1 per 100 pounds of resin solution). The films produced from the resin are clear and glossy.

*Example 3*

150 parts of Neo-Fat II (made up to 90% lauric acid, 9% myristic acid, 1% unsaturated acid and a trace of capric acid) are introduced into a suitable reaction chamber equipped with a stirrer, thermometer and reflux condenser and a tube for admitting an inert gas. The charge is heated to about 200° C. under an atmosphere of nitrogen gas. A mixture of 226 grams of styrene and 11.8 parts of ditertiary butyl peroxide is added dropwise over about a two-hour interval, while a temperature of 200° C. is being maintained. After the styrene-catalyst mixture has been completely added, the heating is continued at about 200° C. for about 1½ hours in order to complete the polymerization of the reaction mixture. The flow of the nitrogen gas through the system is interrupted during the addition of the monomeric styrene and for the heating period that follows. The flow of the nitrogen gas is resumed thereafter and the condenser removed in order to sweep out the unreacted styrene monomer. After 15 minutes of cold blowing (with the inert gas), it is found that 91.7% of the styrene is converted to the polymeric material. While maintaining the temperature of the polymeric material at about 200° C., 148 parts of phthalic acid anhydride and 96 parts of glycerol (98%) are added to the styrenated fatty acid and the mixture is heated gradually to 220° C. at which temperature the alkyd resin is completed, according to the usual fusion method. The final acid number is less than 10 and the resin may be dissolved in xylene or other mineral spirits to give a clear solution at 60% solids. Films of the resin, when heated for 15 minutes at 150° C., are clear, except for a faint bluish cast.

*Example 4*

184 parts of raw castor oil are introduced into a suitable reaction chamber equipped with thermometer, stirrer and reflux condenser and a tube for admitting inert gas and the oil is heated to about 200° C. While maintaining this temperature, a mixture of 291 parts of monomeric styrene and 12.8 parts of ditertiary butyl peroxide catalyst is added in small increments at a uniform rate over a two-hour period. The temperature of the reaction vessel drops to 152° C. as a result of the strong refluxing. After the styrene addition is completed, the heating under reflux is continued for about 4 hours at the end of which time, the temperature has risen to about 182° C. The condenser is removed and the volatile products (consisting essentially of small amounts of unreacted styrene and decomposition products of the catalyst) are swept from the hot styrenated castor oil by passing nitrogen gas through the chamber until substantially all the volatile material has been removed. 0.2 part of calcium hydroxide and 85 parts of glycerine are added and the mixture is heated at 230° C. until a homogeneous phase results when a small sample of the heated mixture is warmed with about a quarter of the amount of the sample of phthalic anhydride. Thereupon, 148 parts of phthalic anhydride are added to the chamber and heating is continued until the esterification is substantially completed, according to the usual fusion process. The resultant styrenated alkyd resin has an acid number of 6 and when dissolved in xylol to 60% solids content, the solution has a viscosity of W— on the Gardner-Holdt scale at 25° C. The resultant solution is clear and films prepared from the solution are clear and hard. The resin is compatible with cellulose nitrate solutions as used for surface coating applications and also is compatible with melamine-formaldehyde resins and urea-formaldehyde resins for this same use. The combination of melamine resin and the above alkyd resin dries to give a hard flexible film.

It has been indicated quite clearly in certain prior art references that it is necessary to use a drying oil in the preparation of styrenated alkyd resins in order to produce resins of satisfactory solution and film clarity. The high degree of unsaturation of drying oils has been looked upon as providing the ethylenic groups considered necessary for copolymerization with styrene. It was further considered necessary that the drying oils or substances containing drying oil radicals should contain a proportion of conjugated double bonds. Even a high degree of unsaturation without conjugation was considered unsatisfactory since linseed oil after styrenation by prior art processes gave opaque films. Styrenated alkyd resins prepared by the prior art processes and containing raw soya oil are cloudy and produce cloudy films. When the first step of the present invention is practiced, the styrenated oil may not be homogeneous but becomes homogeneous after the reaction with the polyhydric alcohol and the polycarboxylic acid. When my process is practiced, the reaction with the alcohol and acid brings about compatibility and homogeneity that did not exist before the alkyd preparation step. Thus, the reaction product of the soya oil and styrene is frequently cloudy at room temperature but after the addition of the glycerol and phthalic anhydride and the alkyd preparation is completed, the product is entirely homogeneous when cool. This is a very important discovery because it is now possible to employ not only the semi-drying oils that do not possess any appreciable conjugated unsaturation but it is also feasible and possible to use completely saturated fatty modifiers. These styrenated alkyd resins made from semi-drying and non-drying oils show certain marked advantages over the styrenated drying oil alkyd resins with respect to greater plasticizing action when blended with other hard resins such as urea-formaldehyde and melamine-formaldehyde surface coating resins. Moreover, styrenated alkyd resins made from raw castor oil have a high degree of compatibility with nitrocellulose lacquer solutions. Drying oil styrenated alkyd resins, on the other hand, have little or no compatibility with this important class of surface coating materials and hence are of little value as plasticizers.

*Example 5*

158 parts of tall oil fatty acids are introduced into a suitable reaction chamber equipped with thermometer, stirrer, and reflux condenser and tube for admitting an inert gas. The contents of the reaction vessel are heated to 200° C. Thereupon, a mixture of 360 parts of styrene and 12 parts of ditertiary butyl peroxide is added gradually over a two-hour period. The temperature of the vessel dropped to about 165° C. after the styrene-catalyst mixture addition because of the strong refluxing. The mixture is heated for an additional 4 hours to a temperature of about 180° C. Nitrogen gas is swept through the vessel in order to blow out any volatile material contained therein. 95% of the styrene is converted to polymeric material. The styrenated oil is then converted into a styrenated alkyd resin by the addition of 48.8 parts of phthalic acid anhydride and 45.6 parts of pentaerythritol and reacting according to the usual process for alkyd preparation. A final acid number of 5.3 is obtained. The resin is soluble in mineral spirits solvent to give a clear solution from which there is obtained a clear, hard film.

*Example 6*

840 parts of refined soya oil are charged into a suitable reaction chamber equipped as in Example 5, and the charge is heated to 170° C. At this temperature, there is added a mixture of 1344 parts of styrene and 30 parts of ditertiary butyl peroxide catalyst, the addition being made gradually over a two-hour period. After the styrene-catalyst mixture has been completely added, the entire mixture is then heated for about 4 hours and the residual volatile material is removed from the mixture by blowing nitrogen gas therethrough. A 98% yield is obtained. 337 parts of the above styrenated oil and 82 parts of refined soya oil are charged to a suitable reaction vessel designed for the preparation of the alkyd resins by the fusion process and the contents are heated over an inert atmosphere of nitrogen gas to a temperature of about 200° C. The mixed oils are then reacted with 71 parts of 98% glycerine in the presence of an alcoholysis catalyst comprising 0.42 part of a mixture of equal parts of calcium hydroxide and soya oil. There is then added 148 parts of phthalic acid anhydride and the alkyd resin is completed by heating to an acid number of about 3. A clear solution having a viscosity of U to V on the Gardner-Holdt scale at 25° C. is obtained from a 50% solids solution of the resin in mineral spirits. Furthermore, clear films are obtained from the solution.

*Example 7*

A mixture of 346 parts of refined soya oil and 4 parts of soya oil acids are introduced in to a suitable reaction chamber equipped as in Example 5. 81 parts of pentaerythritol are then added and the mixture is heated at 260° C. for 2 hours, thus producing the alcoholysis product between the oil, fatty acids, and pentaerythritol. The alcoholysis product is then styrenated by the gradual addition of a mixture of 251 parts of styrene, 13 parts of alpha methyl styrene and 8.3 parts of ditertiary butyl peroxide which addition is accomplished over a two-hour period. The entire mixture is then heated for an additional 5 hours during which time the temperature is allowed to rise gradually to 260° C. Thereupon, 148 parts of phthalic acid anhydride are added to the styrenated alcoholysis product and the alkyd is completed in the conventional manner. A clear solution is obtained with 60% solids resin in mineral spirits and films produced from the solution are clear and hard.

In the preparation of the styrenated alkyd resin of the present invention, it is generally desired to use between about 10 and 70% by weight of monomeric styrene based on the total weight of the styrenated alkyd resin and preferably between 20 and 60% by weight. The amount of oil, which may be used in the preparation of these styrenated alkyd resins may be varied between about 10 and 70% by weight based on the total weight of the styrenated alkyd resin.

In the practice of the process of the present invention, one may use as the non-drying and the semi-drying oils, such materials as coconut oil, palm kernel oil, babassu oil, murumuru oil, tallow, rape seed oil, mustard seed oil, olive oil, peanut oil, corn oil, cottonseed oil, soya bean oil, sunflower oil, walnut oil, raw castor oil, whale oil and the like. The fatty acids from the non-drying and semi-drying oils which may be used in the practice of the process of the present invention include lauric, myristic, palmitic, oleic, palmitoleic, linoleic, and the like. These glyceride oils and the fatty acids thereof are generally a mixture of glycerides or mixtures of fatty acids. These glyceride oils and their fatty acids will generally contain acid residues or acid radicals which are predominantly saturated, or if unsaturated, contain no significant amount of conjugated unsaturation. In certain instances, small percentages of the acids or acid radicals will contain conjugated unsaturation but this will not have any adverse effect on the practice of the process of the present invention. It is then possible to have in a non-drying and, more particularly, in a semi-drying oil or in the fatty acids derived therefrom, as much as 1%, 2%, 5% or even 10% of conjugated unsaturated fatty acids or fatty acid radicals out of the total fatty acid-fatty acid radical content.

Among the vinyl aromatic compounds, of styrene type compounds, which may be used in the practice of the process of the present invention are those compounds containing at least a phenyl or naphthyl radical in combination with the vinyl group, and otherwise structurally similar to styrene. The phenyl or naphthyl group may contain substituents as, for example, the halo groups, chloro, iodo, bromo, or groups such as methoxy, hydroxy, methyl, trichloromethyl, or trifluoromethyl in the ortho, meta or para positions. It is actually preferred that the vinyl aromatic monomer be styrene per se, although p-methylstyrene, p-chlorostyrene, p-fluorostyrene, m-chlorostyrene and m-bromostyrene, m- and p-trichloromethylstyrene and the like may be used.

In the practice of the process of the present invention, it is preferred that the polycarboxylic acids used in the alkyd preparation be those classified as saturated polycarboxylic acids, such as malonic, succinic, glutaric, sebacic, adipic, pimalic, suberic, azaleic, tricarballylic, citric, tartaric, malic, and the like. The preferred polycarboxylic acid is the one most commonly used, namely, phthalic. In addition to using the acids themselves, one could use the anhydrides of the acids, when available, or could use mixtures of these acids or their anhydrides. The amount of the polycarboxylic acids free of non-benzenoid unsaturation used in the styrenated oil-modified resins of the present invention may be varied over a wide range depending on whether or not a short oil, medium oil or long oil alkyd resin is desired. If a short oil alkyd resin is desired, one would use between about 40% and 50% by weight of said polycarboxylic acid based on the total weight of the oil-modified alkyd resin not including the styrene content. For medium oil length alkyd resins, between 30% and 40% of said polycarboxylic acid should be used whereas for long oil alkyd resin, between 20% and 30% by weight of the polycarboxylic acid should be used. Reference is made to H. F. Payne's book entitled "Organic Coating Technology," volume 1, and particularly to pages 277–287, inclusive, among other pertinent parts of the publication.

The use of a catalytic agent in the practice of the process of this invention will serve to increase the speed of reaction, although the absence of such catalytic agents permits the reaction to take place nonetheless. The catalytic agents which may be used in this connection are cumene hydroperoxide, benzoyl peroxide, tertiary butyl hydroperoxide, ditertiary butyl peroxide, 2,2-bis-(tertiary butyl peroxy)-butane, and the like. When it is desired to use the catalyst in producing these styrenated oil-modified alkyd resins, the amounts which are used are the conventional catalytic amounts. Still further, these catalysts may be used singly or in combination with one another.

Among the polyhydric alcohols which may be used in the alkyd formation are arabitol, xylitol, adonitol, mannitol, dulcitol, sorbitol, glycerol, pentaerythritol, dipentaerythritol, and the like. It is important that the polyhydric alcohol used in the process of the present invention have at least 3 hydroxy groups although glycols having only 2 hydroxy groups may be used in combination with polyhydric alcohol having 3 or more hydroxy groups. Included in the glycol group are ethylene glycol, diethylene glycol, trimethylene glycol, tetraethylene glycol, and the like. These polyhydric alcohols may be used either singly or in combination with one another. The amount of the polyhydric alcohol which is used in the process of the present invention can be calculated in a conventional procedure based on stoichiometrical determinations. One may use an amount of polyhydric alcohol varying between the stoichiometrical amount required to completely esterify all carboxyl groups present in the system, i.e., the carboxyl groups present in the polycarboxylic acid and the carboxyl groups present in the non-drying oil fatty acids and the semi-drying oil fatty acids, if any are present, and 20% in excess of the stoichiometrical amount. When the non-drying and semi-drying glyceride oils are used, since they are already esterified to triglycerides, no polyhydric alcohol need be added to esterify the groups that have already been esterified.

The use of the stoichiometrical amounts and/or the 20% excess over the stoichiometrical amount of polyhydric alcohol will insure substantially complete esterification of the carboxyl groups present in the system. This substantially complete esterification point can readily be determined by taking an acid number reading on the system. When the acid number has reached 20 or below, the esterification is substantially complete. It is preferred to continue the reaction until the acid number is 10 or below.

It has been mentioned hereinabove that the alkyd resin prepared according to the present process may be produced either with or without the use of a solvent. If it is desired to use the solvent process, the conventional solvents used in alkyd resin preparation may be used, such as butanol, xylol, aliphatic or aromatic hydrocarbon solvents.

The expression "increment addition" or "dropwise fashion" as used hereinabove means that the styrene-catalyst mixture is added in minute quantities compared with the total amount to be added. These minute quantities of polymerizable monomer which are added may be varied between about 0.28% and 1.1% by weight per minute, based on the total weight of styrene type compound to be added. This addition will be accomplished as a substantially steady stream addition and at a substantially uniform rate. The addition may be accomplished over a period of about 1½ hours to about 6 hours. It is actually preferred that the styrene-catalyst mix be added in amounts varying between about 0.42% and 0.835% per minute based on the total weight of styrene compound to be added. When using these preferred addition amounts, the time may be varied over a narrower range such as between about 2 hours and 4 hours. It has been indicated hereinabove that the addition of the monomer to the heated oil should be in a substantially continuous, constant fashion. The rate of addition, once established, should not be varied except in a case of necessity nor should it be interrupted for any other reason. If, at the outset, however, it is seen that the rate of addition is either too rapid or too slow for the temperature of the oil to which the monomer is being added, the rate of addition can be accelerated or decelerated within the started range. If the rate of addition at the outset is too rapid and an exotherm begins to develop, the addition can be decelerated or stopped completely until the exotherm subsides whereupon a slower rate of addition is initiated at a constant continuous rate, still within the range. The monomer-catalyst addition can be accomplished either by adding a mixture thereof to the heated oil, acids or monoglycerides, or the monomer and catalyst may be added separately and concurrently. Still further, these components may be maintained separate from one another just prior to the addition and may be mixed together as they are being added so as to prevent the possibility of premature polymerization of the mixture of monomer and catalyst. If the monomer and catalyst in admixture are not going to be blended together for any prolonged period of time, these latter approaches become unnecessary.

The temperature to which the oil material is heated during the addition period may be varied as is indicated above at any temperature above 140° C. Temperatures significantly above 200° C. are generally unnecessary. For most desirable results, the oil is maintained at a temperature between about 165 and 195° C. during the monomer addition and the subsequent polymerization reaction.

During the subsequent esterification reaction wherein the polycarboxylic acid free of non-benzenoid unsaturation and the polyhydric alcohol are added in the stated amounts, conventional alkyd reaction temperatures may be utilized. These temperatures may be varied from about 140° C. to about 315° C. and preferably between about 220° C. and 260° C.

During the polymerization step after the monomer addition has been completed, the polymerization is continued until polymerization is substantially complete. Skilled resin chemists are able to determine readily when this point of the reaction has been reached. A nonvolatile content determination is generally made. A sample from the reaction batch is extracted and a nonvolatile determination made which establishes that 5% or less of volatile monomer remains in the system at which point polymerization is substantially completed. One may then go on to the post-forming alkyd resin step by adding the polyhydric alcohol and the polycarboxylic acid free of non-benzenoid unsaturation, either jointly or successively. If the polyhydric alcohol and polycarboxylic acid are not added jointly, the polyhydric alcohol should be added first, particularly if the modifier is a fatty acid rather than the glyceride oil.

This application is a continuation-in-part of my earlier application having the Serial No. 543,034, filed October 26, 1955, now abandoned, entitled "Process for Preparing Styrenated Non-Drying and/or Semi-Drying Oil-Modified Alkyd Resins by Incremental Monomeric Addition," which in turn is a continuation-in-part of my earlier application having the Serial No. 225,660, filed May 10, 1951, now abandoned, entitled "Process for Preparing Modified Alkyd Resins."

I claim:

1. A process for the preparation of styrenated alkyd resin comprising the steps of adding an organic peroxide polymerization catalyst and a polymerizable styrene consisting essentially of a member selected from the group consisting of styrene, a nuclear substituted methyl styrene and a nuclear substituted halo styrene, in an amount varying between about 0.28% and 1.1% by weight, based on the total weight of styrene compound to be added, per minute for a period of time between about 1½ hours and 6 hours, to an oil material selected from the group consisting of non-drying glyceride oils, semi-drying glyceride oils and the fatty acids of said glyceride oils while maintaining the temperature of said oil material at a temperature of at least 140° C., heating the mixture of said oil material, catalyst and styrene compound after the addition of said styrene compound has been completed until substantially complete polymerization has taken place, thereafter adding a polyhydric alcohol having at least 3 hydroxy groups and a polycarboxylic acid free from non-benzenoid unsaturation and heating the entire mixture until substantially complete esterification has been accomplished as is indicated by an acid number of less than 20, wherein said glyceride oils and their fatty acids contain no significant measure of conjugated unsaturation, wherein the amount of polycarboxylic acid free of non-benzenoid unsaturation added varies between about 20% and 50% by weight, based on the total calculated weight of the oil-modified alkyd resin excluding the styrene compound; wherein said polyhydric alcohol is charged in an amount varying between the stoichiometrical amount required to completely esterify all carboxyl groups present in the system and 20% in excess of said stoichiometrical amount; wherein the total amount of said styrene utilized is between about 10% and 70% by weight based on the total weight of said styrenated alkyd resin and wherein the total amount of said oil material utilized is between about 10% and 70% by weight based on the total weight of said styrenated alkyd resin.

2. A process for the preparation of styrenated alkyd resin comprising the steps of adding an organic peroxide polymerization catalyst and a polymerizable styrene consisting essentially of a member selected from the group consisting of styrene, a nuclear substituted methyl styrene and a nuclear substituted halo styrene, in an amount varying between about 0.42% and 0.835% by weight, based on the total weight of styrene compound to be added, per minute for a period of time between about 2 hours and 4 hours, to an oil material selected from the group consisting of non-drying glyceride oils, semi-drying glyceride oils and the fatty acids of said glyceride oils while maintaining the temperature of said oil material at a temperature of at least 140° C., heating the mixture of said oil material, catalyst and styrene compound after the addition of said styrene compound has been completed until substantially complete polymerization has taken place, thereafter adding a polyhydric alcohol having at least 3 hydroxy groups and a polycarboxylic acid free from non-benzenoid unsaturation and heating the entire mixture until substantially complete esterification has been accomplished as is indicated by an acid number of less than 20, wherein said glyceride oils and their fatty acids contain no significant measure of conjugated unsaturation, wherein the amount of polycarboxylic acid free of non-benzenoid unsaturation added varies between about 20% and 50% by weight, based on the total calculated weight of the oil-modified alkyd resin excluding the styrene compound; wherein said polyhydric alcohol is charged in an amount varying between the stoichiometrical amount required to completely esterify all carboxyl groups present in the system and 20% in excess of said stoichiometrical amount; wherein the total amount of said styrene utilized is between about 20% and 60% by weight based on the total weight of said styrenated alkyd resin and wherein the total amount of said oil material utilized is between about 10% and 70% by weight based on the total weight of said styrenated alkyd resin.

3. A process for the preparation of styrenated alkyd resin comprising the steps of adding an organic peroxide polymerization catalyst and a polymerizable styrene consisting essentially of styrene, in an amount varying between about 0.42% and 0.835% by weight, based on the total weight of styrene to be added, per minute for a period of time between about 2 hours and 4 hours, to an oil material selected from the group consisting of non-drying glyceride oils, semi-drying glyceride oils and the fatty acids of said glyceride oils while maintaining the temperature of said oil material at a temperature of at least 140° C., heating the mixture of said oil material, catalyst and styrene after the addition of said styrene has been completed until substantially complete polymerization has taken place, thereafter adding a polyhydric alcohol having at least 3 hydroxy groups and a polycarboxylic acid free from non-benzenoid unsaturation and heating the entire mixture until substantially complete esterification has been accomplished as is indicated by an acid number of less than 20, wherein said glyceride oils and their fatty acids contain no significant measure of conjugated unsaturation, wherein the amount of polycarboxylic acid free of non-benzenoid unsaturation added varies between about 20% and 50% by weight, based on the total calculated weight of the oil-modified alkyd resin excluding the styrene; wherein said polyhydric alcohol is charged in an amount varying between the stoichiometrical amount required to completely esterify all carboxyl groups present in the system and 20% in excess of said stoichiometrical amount; wherein the total amount of said styrene utilized is between about 20% and 60% by weight based on the total weight of said styrenated alkyd resin and wherein the total amount of said oil material utilized is between about 10% and 70% by weight based on the total weight of said styrenated alkyd resin.

4. A process for the preparation of styrenated alkyd resin comprising the steps of adding an organic peroxide polymerization catalyst and a polymerizable styrene consisting essentially of nuclear substituted methyl styrenes, in an amount varying between about 0.42% and 0.835% by weight, based on the total weight of nuclear substituted methyl styrenes to be added, per minute for a period of time between about 2 hours and 4 hours, to an oil material selected from the group consisting of non-drying glyceride oils, semi-drying glyceride oils and the fatty acids of said glyceride oils while maintaining the temperature of said oil material at a temperature of at least 140° C., heating the mixture of said oil material, catalyst and nuclear substituted methyl styrenes after the addition of said nuclear substituted methyl styrenes has been completed until substantially complete polymerization has taken place, thereafter adding a polyhydric alcohol having at least 3 hydroxy groups and a polycarboxylic acid free from non-benzenoid unsaturation and heating the entire mixture until substantially complete esterification has been accomplished as is indicated by an acid number of less than 20, wherein said glyceride oils and their fatty acids contain no significant measure of conjugated unsaturation, wherein the amount of polycarboxylic acid free of non-benzenoid unsaturation added varies between about 20% and 50% by weight, based on the total calculated weight of the oil-modified alkyd resin excluding the nuclear substituted methyl styrene; wherein said polyhydric alcohol is charged in an amount varying between the stoichiometrical amount required to completely esterify all carboxyl groups present in the system and 20% in excess of said stoichiometrical amount; wherein the total amount of said styrene utilized is between about 20% and 60% by weight based on the total weight of said styrenated alkyd resin and wherein the total amount of said oil material utilized is between about 10% and 70% by weight based on the total weight of said styrenated alkyd resin.

5. A process for the preparation of styrenated alkyd resin comprising the steps of adding an organic peroxide polymerization catalyst and a polymerizable styrene consisting essentially of styrene, in an amount varying between about 0.42% and 0.835% by weight, based on the total weight of styrene to be added, per minute for a period of time between about 2 hours and 4 hours, to an oil material selected from the group consisting of non-drying glyceride oils, semi-drying glyceride oils and the fatty acids of said glyceride oils while maintaining the temperature of said oil materials at a temperature of at least 140° C., heating the mixture of said oil material, catalyst and styrene after the addition of said styrene has been completed until substantially complete polymerization has taken place, thereafter adding a polyhydric alcohol having at least 3 hydroxy groups and a polycarboxylic acid free from non-benzenoid unsaturation and heating the entire mixture until substantially complete esterification has been accomplished as is indicated by an acid number of less than 10, wherein said glyceride oils and their fatty acids contain no significant measure of conjugated unsaturation, wherein the amount of polycarboxylic acid free of non-benzenoid unsaturation added varies between about 20% and 50% by weight, based on the total calculated weight of the oil-modified alkyd resin excluding the styrene; wherein said polyhydric alcohol is charged in an amount varying between the stoichiometrical amount required to completely esterify all carboxyl groups present in the system and 20% in excess of said stoichiometrical amount; wherein the total amount of said styrene utilized is between about 20% and 60% by weight based on the total weight of said styrenated alkyd resin and wherein the total amount of said oil material utilized is between about 10% and 70% by weight based on the total weight of said styrenated alkyd resin.

6. A process for the preparation of styrenated alkyd resin comprising the steps of adding an organic peroxide polymerization catalyst and a polymerizable styrene consisting essentially of nuclear substituted methyl styrenes in an amount varying between about 0.42% and 0.835% by weight, based on the total weight of nuclear substituted methyl styrenes to be added, per minute for a period of time between about 2 hours and 4 hours, to an oil material selected from the group consisting of non-drying glyceride oils, semi-drying glyceride oils and the fatty acids of said glyceride oils while maintaining the temperature of said oil material at a temperature of at least 140° C., heating the mixture of said oil material, catalyst and nuclear substituted methyl styrenes after the addition of said nuclear substituted methyl styrenes has been completed until substantially complete polymerization has taken place, thereafter adding a polyhydric alcohol having at least 3 hydroxy groups and a polycarboxylic acid free from non-benzenoid unsaturation and heating the entire mixture until substantially complete esterification has been accomplished as is indicated by an acid number of less than 10, wherein said glyceride oils and their fatty acids contain no significant measure of conjugated unsaturation, wherein the amount of polycarboxylic acid free of non-benzenoid unsaturation added varies between about 20% and 50% by weight, based on the total calculated weight of the oil modified alkyd resin excluding the nuclear substituted methyl styrene; wherein said polyhydric alcohol is charged in an amount varying between the stoichiometrical amount required to completely esterify all carboxyl groups present in the system and 20% in excess of said stoichiometrical amount; wherein the total amount of said styrene utilized is between about 20% and 60% by weight based on the total weight of said styrenated alkyd resin and wherein the total amount of said oil material utilized is between about 10% and 70% by weight based on the total weight of said styrenated alkyd resin.

7. A process for the preparation of styrenated alkyd resin comprising the steps of adding an organic peroxide polymerization catalyst and a polymerizable styrene consisting essentially of styrene, in an amount varying between about 0.42% and 0.835% by weight, based on the total weight of styrene to be added, per minute for a period of time between about 2 hours and 4 hours, to an oil material selected from the group consisting of non-drying glyceride oils, semi-drying glyceride oils and the fatty acids of said glyceride oils while maintaining the temperature of said oil material at a temperature of at least 140° C., heating the mixture of said oil material, catalyst and styrene after the addition of said styrene has been completed until substantially complete polymerization has taken place, thereafter adding glycerol and phthalic anhydride and heating the entire mixture until substantially complete esterification has been accomplished as is indicated by an acid number of less than 10, wherein said glyceride oils and their fatty acids contain no significant measure of conjugated unsaturation, wherein the amount of phthalic anhydride varies between about 20% and 50% by weight, based on the total calculated weight of the oil-modified alkyd resin excluding the styrene, wherein said glycerol is charged in an amount varying between the stoichiometrical amount required to completely esterify all carboxyl groups present in the system and 20% in excess of said stoichiometrical amount; wherein the total amount of said styrene utilized is between about 20% and 60% by weight based on the total weight of said styrenated alkyd resin and wherein the total amount of said oil material utilized is between about 10% and 70% by weight based on the total weight of said styrenated alkyd resin.

8. A process for the preparation of styrenated alkyd resin comprising the steps of adding an organic peroxide polymerization catalyst and a polymerizable styrene consisting essentially of nuclear substituted methyl styrenes, in an amount varying between about 0.42% and 0.835% by weight, based on the total weight of nuclear substituted methyl styrene to be added, per minute for a period of time between about 2 hours and 4 hours, to an oil material selected from the group consisting of non-drying glyceride oils, semi-drying glyceride oils and the fatty acids of said glyceride oils while maintaining the temperature of said oil material at a temperature of at least 140° C., heating the mixture of said oil material, catalyst and nuclear substituted methyl styrenes after the addition of said nuclear substituted methyl styrenes has been completed until substantially complete polymerization has taken place, thereafter adding glycerol and phthalic anhydride and heating the entire mixture until substantially complete esterification has been accomplished as is indicated by an acid number of less than 10, wherein said glyceride oils and their fatty acids contain no significant measure of conjugated unsaturation, wherein the amount of phthalic anhydride varies between about 20% and 50% by weight, based on the total calculated weight of the oil-modified alkyd resin excluding the nuclear substituted methyl styrenes; wherein said glycerol is charged in an amount varying between the stoichiometrical amount required to completely esterify all carboxyl groups present in the system and 20% in excess of said stoichiometrical amount; wherein the total amount of said styrene utilized is between about 20% and 60% by weight based on the total weight of said styrenated alkyd resin and wherein the total amount of said oil material utilized is between about 10% and 70% by weight based on the total weight of said styrenated alkyd resin.

References Cited in the file of this patent

UNITED STATES PATENTS

| 2,468,748 | Griess et al. | May 3, 1949 |
| 2,495,458 | Kanning et al. | Jan. 24, 1950 |
| 2,713,039 | Cadwell et al. | July 12, 1955 |
| 2,890,185 | Sample et al. | June 9, 1959 |

UNITED STATES PATENT OFFICE
CERTIFICATE OF CORRECTION

Patent No. 2,986,543                                May 30, 1961

John H. Daniel, Jr.

It is hereby certified that error appears in the above numbered patent requiring correction and that the said Letters Patent should read as corrected below.

Column 6, line 22, for "of" read -- or --; column 7, line 70, for "started" read -- stated --.

Signed and sealed this 5th day of December 1961.

(SEAL)
Attest:

ERNEST W. SWIDER                              DAVID L. LADD
Attesting Officer                                Commissioner of Patents